US012663142B1

(12) United States Patent
Liu

(10) Patent No.: US 12,663,142 B1
(45) Date of Patent: Jun. 23, 2026

(54) ELONGATED ILLUMINANT STORAGE DEVICE

(71) Applicant: Shenzhen Decktok Smart Lighting Co., Ltd., Shenzhen (CN)

(72) Inventor: Xinglin Liu, Shenzhen (CN)

(73) Assignee: Shenzhen Decktok Smart Lighting Co., Ltd., Shenzhen (CN)

( * ) Notice: Subject to any disclaimer, the term of this patent is extended or adjusted under 35 U.S.C. 154(b) by 0 days.

(21) Appl. No.: 19/330,876

(22) Filed: Sep. 17, 2025

(30) Foreign Application Priority Data

Aug. 25, 2025 (CN) ......................... 202521818770.7

(51) Int. Cl.

| | |
|---|---|
| ***F21V 27/00*** | (2006.01) |
| ***B65H 75/40*** | (2006.01) |
| ***B65H 75/44*** | (2006.01) |
| ***B65H 75/48*** | (2006.01) |
| ***F21S 4/20*** | (2016.01) |
| ***F21S 4/22*** | (2016.01) |
| ***F21V 17/00*** | (2006.01) |

(52) U.S. Cl.
CPC ......... *F21V 17/007* (2013.01); *B65H 75/406* (2013.01); *B65H 75/4471* (2013.01); *B65H 75/48* (2013.01); *F21S 4/20* (2016.01); *B65H 2701/3915* (2013.01)

(58) Field of Classification Search
CPC ... F21V 27/005; F21S 4/20; F21S 4/22; F21S 4/24; F21S 4/26
See application file for complete search history.

(56) References Cited

U.S. PATENT DOCUMENTS 6,925,967 B1 * 8/2005 Woodruff ............. A01K 27/004 119/796

* cited by examiner

*Primary Examiner* — Sean P Gramling
(74) *Attorney, Agent, or Firm* — Jose Cherson Weissbrot

(57) ABSTRACT

The present application discloses an elongated illuminant storage device, including: a reel rotatable about an axis thereof; a spiral spring energy storage member connected to the reel and configured to store a potential energy generated during rotation of the reel; an elongated illuminant made of a flexible material, wound on the reel, and having one end fixedly connected to the reel and the other end being a free end, where when an outward pulling force is applied to the free end, the elongated illuminant is capable of being pulled out, and the reel is driven to rotate, in this case, the spiral spring energy storage member stores the potential energy generated during rotation of the reel, and when the pulling force is removed, the spiral spring energy storage member causes the reel to rotate reversely by means of the stored potential energy.

5 Claims, 3 Drawing Sheets

ELONGATED ILLUMINANT STORAGE DEVICE

TECHNICAL FIELD

The present application relates to the technical field of lighting devices, and in particular to an elongated illuminant storage device.

BACKGROUND

Elongated illuminants are decorative lighting tools commonly used indoors and outdoors and are widely applied in various lighting scenarios.

Currently, the elongated illuminants used outdoors are relatively thin and long, and are prone to tangling or knotting, which is inconvenient for storage and carrying, and requires time-consuming untangling during use, making them quite inconvenient. In the prior art, a winding body for storing the elongated illuminant is provided, and the elongated illuminant needs to be manually wound on the winding body, which is time-consuming.

SUMMARY

The present application provides an elongated illuminant storage device, including:

- a reel rotatable about an axis thereof;
- a spiral spring energy storage member connected to the reel;
- an elongated illuminant having one end fixedly connected to the reel and the other end being a free end, wherein a portion of the elongated illuminant between the one end and the free end is capable of being wound around the reel, when a pulling force is applied to the free end, the elongated illuminant is capable of being pulled out, and the reel is driven to rotate forwardly, causing the spiral spring energy storage member to store a potential energy generated by rotation of the reel, and when the pulling force is removed, the spiral spring energy storage member releases the stored potential energy to cause the reel to rotate reversely; and
- a housing for accommodating the storage device, an electrical energy storage element and the elongated illuminant.

The above description is merely presented for the purpose of the specification, and is not intended to limit the present disclosure in any way. In addition to the above illustrative aspects, implementations and features, further aspects, implementations and features of the present application will become readily apparent with reference to the accompanying drawings and the following detailed description.

BRIEF DESCRIPTION OF THE DRAWINGS

In accompanying drawings, the same reference signs denote the same or similar components or elements throughout multiple drawings unless otherwise specified. These drawings are not necessarily drawn to scale. It should be understood that these drawings depict only some implementations according to the present application and should not be construed as limiting the scope of the present application.

LIST OF REFERENCE SIGNS

Figure 1:
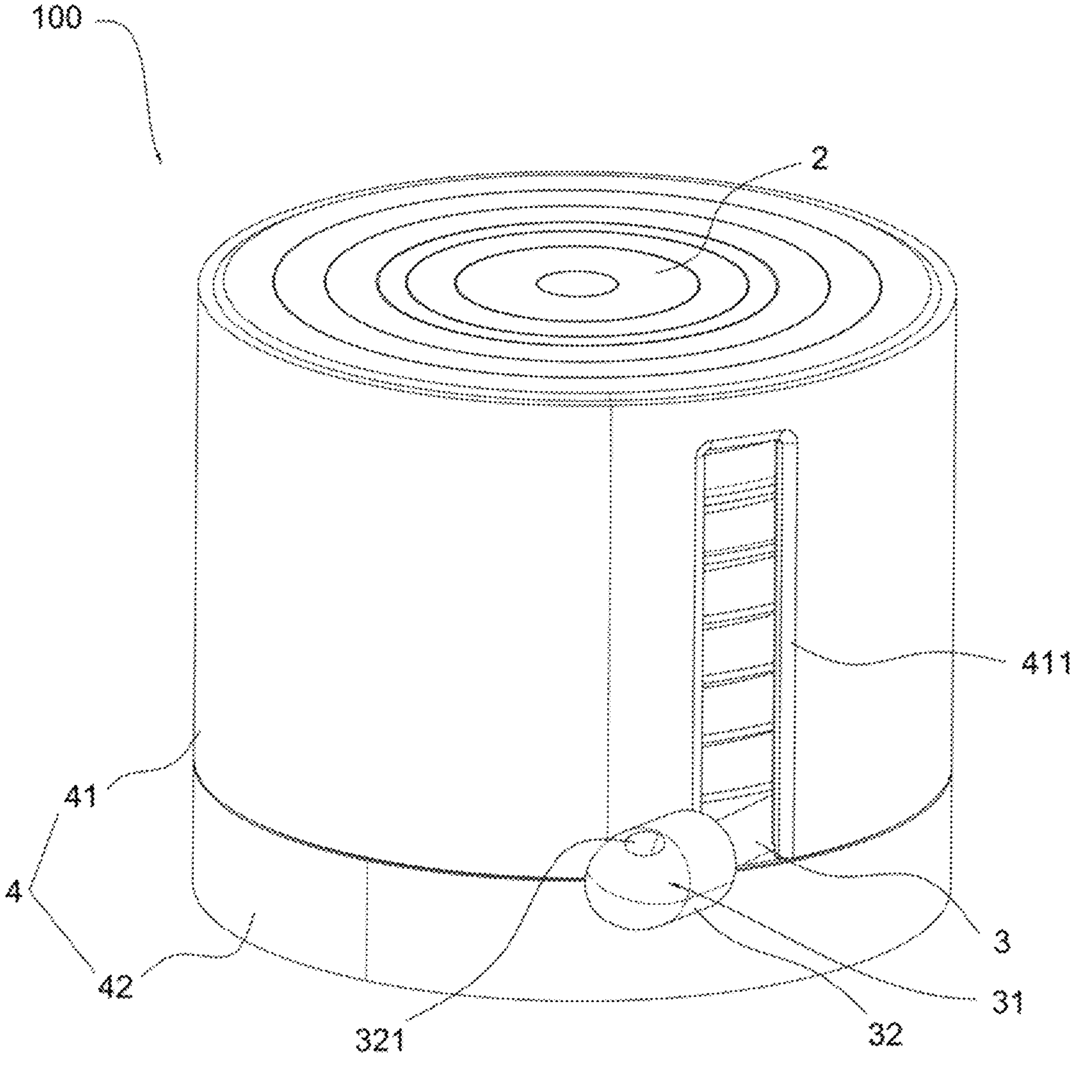
FIG. 1 is a perspective view of an elongated illuminant storage device of the present application.

1. Reel; 11. Guide groove; 2. Spiral spring energy storage member; 3. Elongated illuminant; 31. Free end; 32. End cap; 321. Through hole; 4. Housing; 41. Housing body; 411. Opening; 42. Base; 6. Electrical energy storage element; 7. Battery support; 8. Printed circuit board; 9. Charging contact; 10. Circuit board support; 100. Elongated illuminant storage device.

DETAILED DESCRIPTION OF EMBODIMENTS

Various different implementations or embodiments carrying out the subject matter and technical solutions are disclosed as follows. To simplify the disclosure, specific examples of elements and arrangements will be described below. Of course, these examples are merely exemplary, and are not intended to limit the scope of protection of the present application. For example, a first feature recorded later in the specification being formed above or over a second feature can include an implementation of forming a direct contact of the first and second features, and can also include an implementation of forming an additional feature between the first feature and the second feature such that the first and second features may not be in direct contact. In addition, reference numerals and/or letters may be repeated in different examples in the disclosure. This repetition is for the sake of brevity and clarity, and does not itself represent the relationship between the various implementations and/or structures to be discussed. Further, when a first element is described as being connected or coupled to a second element, the description includes an implementation in which the first and second elements are directly connected or coupled to each other, and also includes an implementation in which the first and second elements are indirectly connected or coupled to each other by using one or more other intervening elements.

Only some exemplary embodiments are briefly described below. As can be appreciated by those skilled in the art, modifications may be made to the described embodiments in various ways without departing from the spirit or scope of the present application. Therefore, the accompanying drawings and the description are considered as exemplary in nature rather than limiting.

Figure 2:
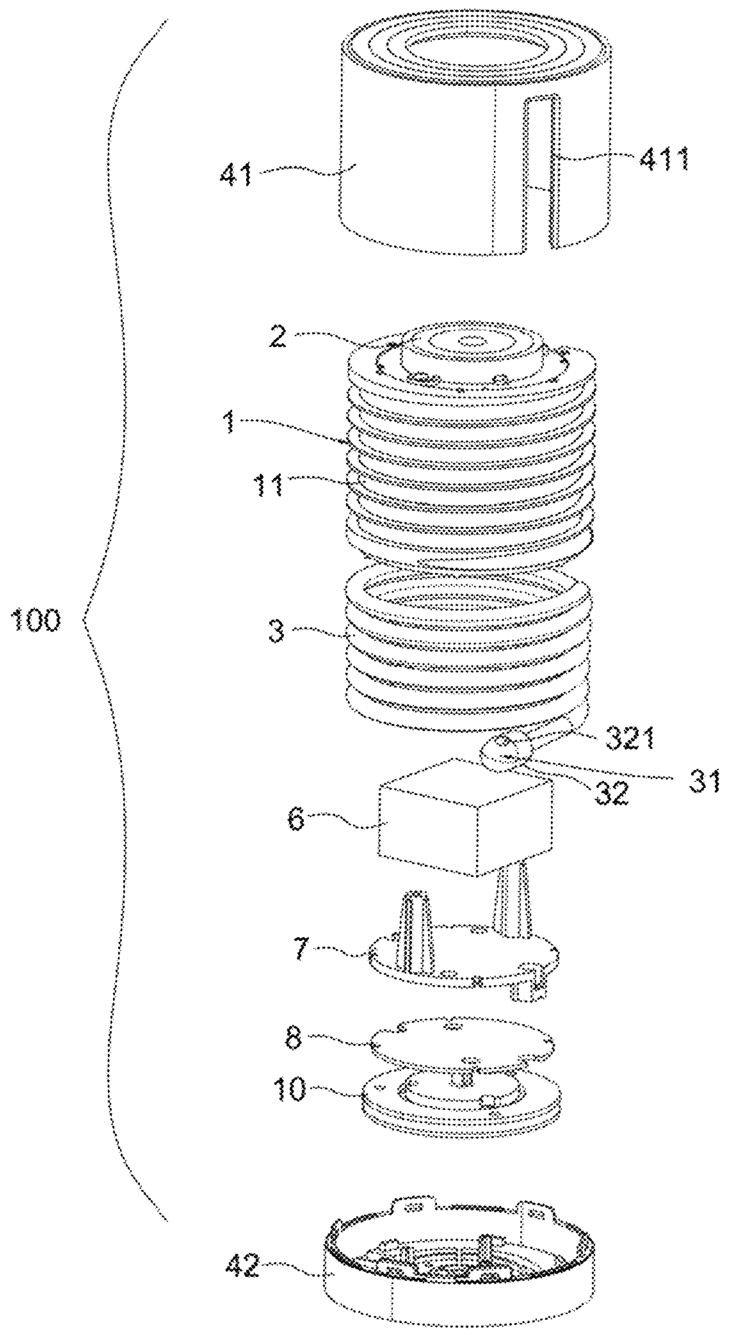
FIG. 2 is an exploded view of the elongated illuminant storage device shown in FIG. 1.
Figure 3:
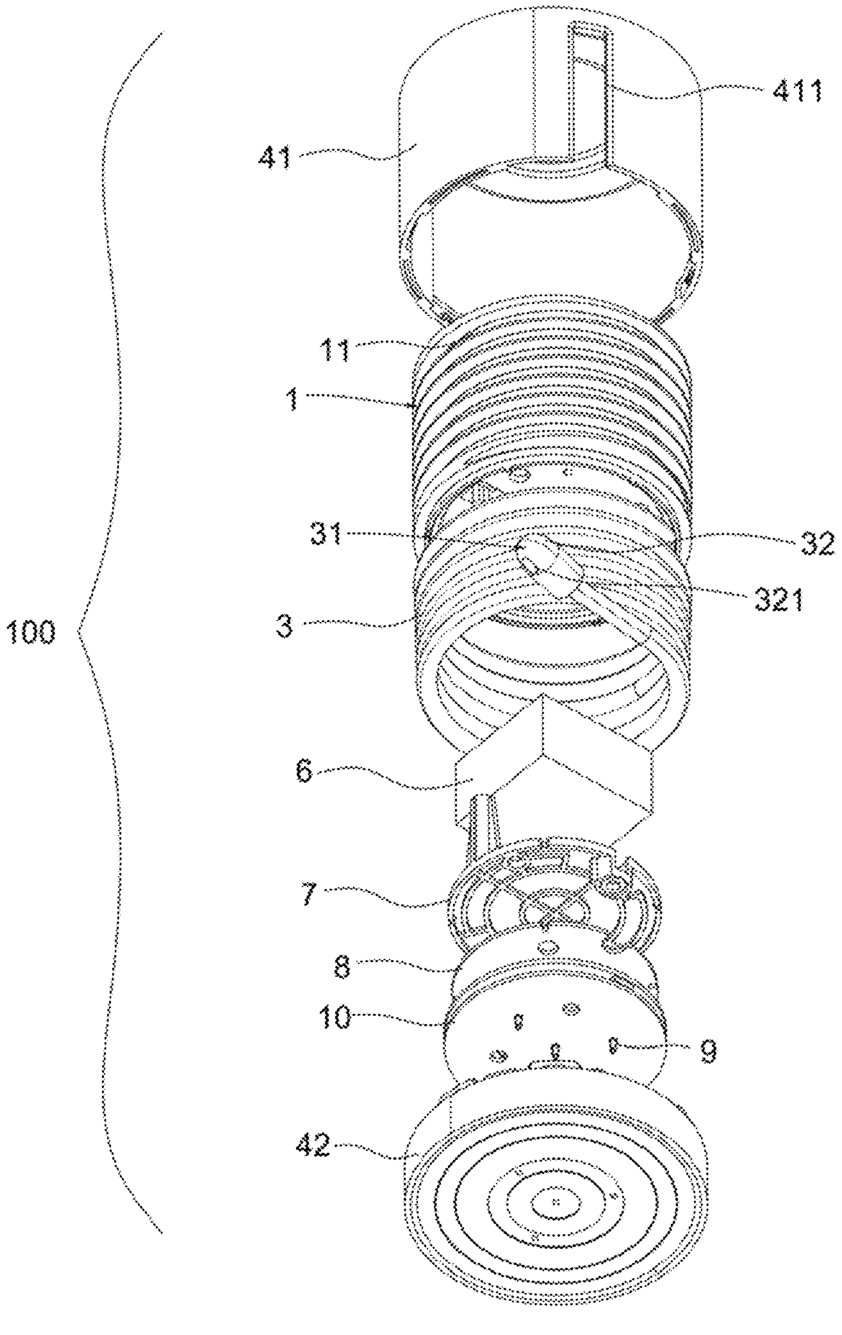
FIG. 3 is an exploded view of the elongated illuminant storage device shown in FIG. 1 from another perspective.

Referring to FIGS. 1 to 3, in an embodiment of the present application, an elongated illuminant storage device 100 includes: a reel 1 rotatable about an axis thereof; a spiral spring energy storage member 2 connected to the reel 1; an elongated illuminant 3 having one end fixedly connected to the reel 1 and the other end being a free end 31, where a portion of the elongated illuminant 3 between the one end and the free end is capable of being wound around the reel 1, when a pulling force is applied to the free end 31, the elongated illuminant 3 is capable of being pulled out, and the reel 1 is driven to rotate forwardly, causing the spiral spring energy storage member 2 to store a potential energy generated by rotation of the reel 1, and when the pulling force is removed, the spiral spring energy storage member 2 releases the stored potential energy to cause the reel 1 rotate reversely; and a housing 4 for accommodating the storage device, an electrical energy storage element 6 and the elongated illuminant 3.

According to the elongated illuminant storage device 100 of this embodiment, in a natural state, the elongated illuminant 3 is stored on the reel 1. In this case, the spiral spring energy storage member 2 has a smallest elastic potential energy, and a tightening force provided by the spiral spring energy storage member prevents the elongated illuminant 3 from extending out of the reel 1 naturally. When the free end 31 is pulled, the rotation of the reel 1 increases the elastic potential energy of the spiral spring energy storage member 2, so when the pulling force on the elongated illuminant 3 is removed, the elastic potential energy is converted into a force that cause the reel 1 to rotate reversely, thereby retracting the elongated illuminant 3 onto the reel 1. In some embodiments, the spiral spring energy storage member 2 further has a limiting function. That is, when the elongated illuminant 3 is pulled out to a certain length and the pulling force is removed, the spiral spring energy storage member 2 can restrict the reel 1 from rotating reversely, and when the limiting function of the spiral spring energy storage member 2 is actively released, the elastic potential energy stored in the spiral spring energy storage member 2 can then be converted into the force that causes the reel 1 to rotate reversely. According to the elongated illuminant storage device 100 of this embodiment, the elongated illuminant 3 is conveniently used by directly pulling the elongated illuminant 3 out from the reel 1, and is less prone to tangling or knotting, and during storage, the elongated illuminant 3 can be automatically retracted onto the reel 1 under the action of the spiral spring energy storage member 2, making it easy to operate and carry. By providing the housing 4, the reel 1, the spiral spring energy storage member 2 and the elongated illuminant 3 accommodated therein can be protected from damage by external objects, and the case of storage and carrying is also achieved. In some embodiments, the housing 4 includes a housing body 41 and base 42. In some embodiments, only the base 42 may be provided without the housing body 41.

Referring to FIGS. 1 to 3, in some embodiments, the reel 1 is provided with a spiral guide groove 11 for guiding the elongated illuminant 3 to be wound and stored layer by layer in an axial direction of the reel 1, the guide groove 11 having a groove width adapted to a width or diameter of the elongated illuminant 3. The guide groove 11 in this embodiment enables smoother storing and pulling-out processes of the elongated illuminant 3, and limits displacement of the elongated illuminant 3, and after being stored, the elongated illuminant 3 is evenly arranged in a radial direction of the reel 1, which can further save space and facilitate carrying. It will be understood that, in some embodiments, the elongated illuminant 3 may be stored on the reel 1 in a horizontally coiled manner or in a vertically helical manner.

Referring to FIGS. 1 to 3, in some embodiments, an end cap 32 is provided at the free end 31, and the end cap 32 is provided with a through hole 321 for hanging the elongated illuminant 3. The through hole 321 is configured for passage of an external fixing member to connect the free end 31 of the elongated illuminant 3 to the external fixing member. The external fixing member refers to a nail or a hook, which may be arranged on a wall, a tree, etc., and the specific arrangement scenarios are not specifically limited here. The provision of the end cap 32 can facilitate better force application when pulling out the elongated illuminant 3, and the through hole 321 formed therein allows the elongated illuminant 3 to be hung or fixed at any position, making it suitable for various application scenarios.

In some embodiments, the elongated illuminant 3 is a flexible light strip or light string. In this embodiment, the light strip is typically a continuously light-emitting strip with each section having an equal radius, and the light string is typically formed by connecting a plurality of independent light bulbs in series by means of wires. Further, the elongated illuminant 3 may be a flexible printed circuit board 8 (FPCB) light strip, a sleeved flexible light strip, a copper wire light string, a sleeved copper wire light string, etc., can be wound and stored due to its flexibility, and thus can be arranged as required when in use, which is suitable for outdoor or multi-scenario arrangement. It will be understood that the elongated illuminant 3 may be any form of strip-shaped flexible illuminant.

Referring to FIGS. 1 to 3, in some embodiments, the housing 4 is provided with an opening 411 for the elongated illuminant 3 to pass through. A longitudinal length of the opening 411 is set based on an axial distance of the guide groove 11 along the reel 1, such that the elongated illuminant 3 can pass through the opening 411 at any pulled-out or retracted length without opening the housing 4.

Referring to FIGS. 2 to 3, in some embodiments, the electrical energy storage element 6 is further provided. The electrical energy storage element 6 is electrically connected to the elongated illuminant 3 for providing electrical energy to the elongated illuminant 3. According to the elongated illuminant storage device 100 of this embodiment, self-powering can be realized without relying on a fixed power supply, and the elongated illuminant 3 can be arranged at any time in any scenario, especially outdoors where no power supply is available.

In some embodiments, the electrical energy storage element 6 is a ternary lithium battery or a lithium cobaltate battery, which is suitable for use as the electrical energy storage element 6 for storing electrical energy in a small-volume electrical appliance due to its high energy density.

Referring to FIGS. 2 to 3, in some embodiments, a battery support 7 is provided. The battery support 7 is connected to the reel 1 for fixing the electrical energy storage element 6 to the reel 1. In this embodiment, the battery can rotate together with the reel 1, such that the battery is stationary relative to the end of the elongated illuminant 3 fixed to the reel 1, to prevent a wire between the elongated illuminant 3 and the battery from being broken due to excessive rotation during rotating.

Referring to FIG. 3, in some embodiments, a printed circuit board 8 and a charging contact 9 are further provided. The printed circuit board 8 is electrically connected to the electrical energy storage element 6, and the charging contact 9 is electrically connected to the printed circuit board 8 for charging the electrical energy storage element 6. By means of the charging contact 9, the electrical energy storage element 6 can be charged, and the circuit board can control the charging power, and actively stop charging when the battery is fully charged, to prevent overcharging from affecting the service life of the battery.

Referring to FIGS. 2 to 3, in some embodiments, a circuit board support 10 is further provided for fixing the printed circuit board 8 to the reel 1, and the charging contact 9 is arranged on the circuit board support 10. In this embodiment, the printed circuit board 8, the charging contact 9 and the battery can rotate together with the reel 1, so as to be stationary relative to the end of the elongated illuminant 3 fixed to the reel 1, thereby preventing wires connecting various electrical components from being broken due to excessive rotation during rotating.

According to the elongated illuminant storage device 100 of the present application, the elongated illuminant 3 is conveniently used by directly pulling the elongated illuminant 3 out from the reel 1, and is less prone to tangling or knotting. During storage, the elongated illuminant 3 can be automatically retracted onto the reel 1 under the action of the spiral spring energy storage member 2, making it easy to operate and carry. The built-in electrical energy storage element 6 can directly provide electrical energy for the elongated illuminant 3 without an external power supply, which is more suitable for multi-scenario use.

In the description of this specification, descriptions with reference to the terms such as "an embodiment", "some embodiments", "example", "specific example", or "some examples" mean that specific features, structures, materials, or characteristics described with reference to the embodiment or example are included in at least one embodiment or example of the present application. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms "first" and "second" are merely used for the purpose of illustration, and cannot be construed as indicating or implying relative importance or implicitly indicating the number of technical features indicated. Thus, the features defined with "first" and "second" may explicitly or implicitly include at least one of the features. In the description of the present application, the meaning of "a plurality of" is two or more, unless explicitly and specifically defined otherwise.

The above description is merely specific implementations of the present application, but is not intended to limit the scope of protection of the present application. Any variation or replacement readily figured out by a person skilled in the art within the technical scope disclosed in the present application shall fall within the scope of protection of the present application. Therefore, the scope of protection of the present application shall be subject to the scope of protection of the claims.

What is claimed is:

1. An elongated illuminant storage device, comprising:

a reel rotatable about an axis thereof;

a spiral spring energy storage member connected to the reel;

an elongated illuminant having one end fixedly connected to the reel and the other end being a free end, wherein a portion of the elongated illuminant between the one end and the free end is capable of being wound around the reel, when a pulling force is applied to the free end, the elongated illuminant is capable of being pulled out, and the reel is driven to rotate forwardly, causing the spiral spring energy storage member to store a potential energy generated by rotation of the reel, and when the pulling force is removed, the spiral spring energy storage member releases the stored potential energy to cause the reel to rotate reversely; and a housing for accommodating the storage device, an electrical energy storage element and the elongated illuminant;

wherein the reel is provided with a spiral guide groove for guiding the elongated illuminant to be wound and stored layer by layer in an axial direction of the reel, the spiral guide groove having a groove width adapted to a width or diameter of the elongated illuminant.

2. The elongated illuminant storage device according to claim 1, wherein an end cap is provided at the free end, and a through hole is provided in the end cap for passage of an external fixing member to connect the free end of the elongated illuminant to the external fixing member.

3. The elongated illuminant storage device according to claim 1, wherein the elongated illuminant is a flexible light strip or light string.

4. The elongated illuminant storage device according to claim 1, wherein the housing is provided with an opening for the elongated illuminant to pass through.

5. The elongated illuminant storage device according to claim 1, further comprising the electrical energy storage element, the electrical energy storage element being electrically connected to the elongated illuminant for providing electrical energy to the elongated illuminant.

* * * * *